United States Patent [19]
Dirmeier et al.

[11] Patent Number: 6,059,500
[45] Date of Patent: *May 9, 2000

[54] ARRANGEMENT AND METHOD FOR DETECTING A FATIGUE FRACTURE OF A BOLTED CONNECTION CAUSED BY OVERSTRESSING

[75] Inventors: Georg Dirmeier, Stuttgart; Siegfried Emmann, Weinstadt; Manfred Haller, Stuttgart, all of Germany

[73] Assignee: DaimlerChrysler AG, Stuttgart, Germany

[ * ] Notice: This patent is subject to a terminal disclaimer.

[21] Appl. No.: 09/245,089

[22] Filed: Feb. 5, 1999

[30] Foreign Application Priority Data

Feb. 5, 1998 [DE] Germany ............................ 198 04 458

[51] Int. Cl.[7] ............................. F16B 31/02; F16B 39/30
[52] U.S. Cl. ................................. 411/14; 411/8; 411/263; 411/307
[58] Field of Search ................................ 411/8, 9, 13, 14, 411/5, 263, 307, 308

[56] References Cited

U.S. PATENT DOCUMENTS

| | | | |
|---|---|---|---|
| 1,957,784 | 5/1934 | Johnson | 287/62 |
| 3,224,316 | 12/1965 | Grikscheit et al. | 411/13 |
| 3,405,751 | 10/1968 | Parr . | |
| 3,599,528 | 8/1971 | Kushnick . | |
| 3,602,976 | 9/1971 | Grube | 29/407 |
| 4,097,108 | 6/1978 | Prodel | 339/109 |
| 4,244,661 | 1/1981 | Dervy | 403/243 |
| 4,661,031 | 4/1987 | Heine | 411/263 |
| 5,018,920 | 5/1991 | Speakman | 411/43 |
| 5,088,867 | 2/1992 | Mun | 411/13 |
| 5,938,383 | 8/1999 | Dirmeier et al. | 411/5 |

FOREIGN PATENT DOCUMENTS

| | | |
|---|---|---|
| 542463 | 1/1932 | Germany . |
| 1 944 805 | 11/1970 | Germany . |
| 78 21 489 | 10/1978 | Germany . |
| 28 03 721 | 8/1979 | Germany . |
| 29 39 096 | 4/1981 | Germany . |
| 37 25 792 | 2/1989 | Germany . |
| 39 34 952 | 4/1991 | Germany . |
| 43 22 717 | 1/1995 | Germany . |
| 196 37 592 | 11/1997 | Germany . |
| 1 298 095 | 11/1972 | United Kingdom . |
| 1 417 108 | 12/1975 | United Kingdom . |

OTHER PUBLICATIONS

"Bolt Stress Measured By Calculating Wave Speed", Machine Design, May 24, 1990, p. 64.

Witte, Dr.–Ing. H., et al., "Bolts for Steel Constructions", MERKBLATT322, pp. 1–35.

Long–Lok, Schraubensicherungen GmbH brochure, 6 pages.

*Primary Examiner*—Neill Wilson
*Attorney, Agent, or Firm*—Evenson, McKeown, Edwards & Lenahan, P.L.L.C.

[57] ABSTRACT

An arrangement for detecting a fatigue fracture caused by overstressing of a bolted connection including a bolt and an internal-thread-bearing hollow section which is alternately stressed by an axial flux of force between zero and different maximal values. A transverse crack forms at a predetermined breaking point of the bolted connection, at which the hollow section breaks due to fatigue. The spacing of the predetermined breaking point from the connection ends, and the interaction of the bolt and the hollow section, are designed such that, after the breakage, the bolt forms in the hollow section a residual joining connection which can be alternatingly stressed. In order to signal the occurrence of a crack on the hollow section of the bolted connection in the event of a fracture caused by fatigue in a simple and always noticeable manner, the arrangement has an additional signaling device. The signaling device is arranged at least on the section of the residual joining connection formed by the area with play of the bolted connection such that the crack causes its destruction, whereby the device causes at least one signal which can be noticed visually or acoustically. The signaling device may be microcapsules containing dye arranged in the threads, a hollow space adjacent the bolt filled with pressurized gas, or a ripping wire attached to the hollow section.

10 Claims, 2 Drawing Sheets

ARRANGEMENT AND METHOD FOR DETECTING A FATIGUE FRACTURE OF A BOLTED CONNECTION CAUSED BY OVERSTRESSING

BACKGROUND AND SUMMARY OF THE INVENTION

This application claims the priority of German patent 198 04 458.5-12, filed Feb. 5, 1998, the disclosure of which is expressly incorporated by reference herein.

The invention relates to an arrangement and a method for detecting a fatigue fracture of a bolted connection caused by overstressing.

An arrangement of this type is known from commonly-owned U.S. patent application Ser. No. 08/929,259 (counterpart of German Patent Document DE 196 37 592 C1), the disclosure of which is expressly incorporated by reference herein. Because of the special construction and division of the bolted connection into an area which axially and radially has play and into an area which has no play, a predetermined breaking point is created at the transition between the areas which, after a defined number of overstressing situations exercised on the bolted connection will break as the result of material fatigue or during an excessive overstressing, whereby the resulting crack extends in a locally defined manner transversely to the longitudinal course of the bolted connection, thus in the circumferential direction. If the area without play starts from the bolt head and the dimensions of the bolt are designed correspondingly in comparison to the hollow section, the hollow section will break while a still sufficiently supporting residual joining connection remains between the bolt and the hollow section, the flux of force of the overstressing taking place only by way of the now supporting area which has play. However, sometimes the crack is not clearly visible with the naked eye and is therefore not obvious so that no close examination is made. This examination will only take place during a regular inspection, during which a possible crack is detected by use of suitable detection apparatuses, for example, on an ultrasound basis or by measuring the conducting capacity. However, in this case, the finding of the crack is facilitated by means of the site of the predetermined breaking point known a priori.

It is an object of the invention to further develop an arrangement of the above-mentioned type such that the occurrence of the crack on the hollow section of the bolted connection in the case of a fracture caused by fatigue can be detected in a simple manner at any time.

According to the invention, this and other objects have been achieved by providing an arrangement for detecting a fatigue fracture due to alternate axial stress in a bolted connection, comprising: a hollow section having an internal thread; a bolt with an external thread being threaded into said internal thread of said hollow section over an axial distance, said axial distance including a rearward area extending from a connection end of the bolt with play between said internal thread and said external thread, and a forward area adjacent to said rearward area without play between said internal thread and said external thread, said rearward area and said forward area defining a predetermined breaking point therebetween at which said hollow section will crack in a transverse direction due to fatigue from said alternate axial stress, said predetermined breaking point being located such that the bolt continues to support the hollow section at the rearward area after said hollow section cracks; and a signaling device arranged adjacent said predetermined breaking point, said signaling device triggering at least one signal which can be noticed visually or acoustically when said hollow section cracks.

According to the invention, the crack of the hollow section can be easily detected because the observer receives visually and/or acoustically noticeable signals which draw attention to the crack. The device which automatically triggers these signals simulates the effect of the overstressing existing in the case of a material fatigue, which is exhibited in the crack of the hollow section, in parallel thereto or shortly after the crack formation. Due to the signaling device's contact with the two areas and because it extends in both areas, it is destroyed by the crack and, when it is arranged only in the area of the residual joining connection, it is destroyed by the stressing of the bolted connection displaced to the area with play. When the device is destroyed, it causes the emission of the above-mentioned signals. The device may have any conceivable simple design. It must only be destructible and be able to transmit a signal at the point in time of its destruction which comes to the attention of the person using the article containing the bolted connection. A display of the signal may take place by way of the device itself or by a separate display device, whose manufacturing results in only low expenditures.

Other objects, advantages and novel features of the present invention will become apparent from the following detailed description of the invention when considered in conjunction with the accompanying drawings.

DETAILED DESCRIPTION OF THE DRAWINGS

Figure 1:
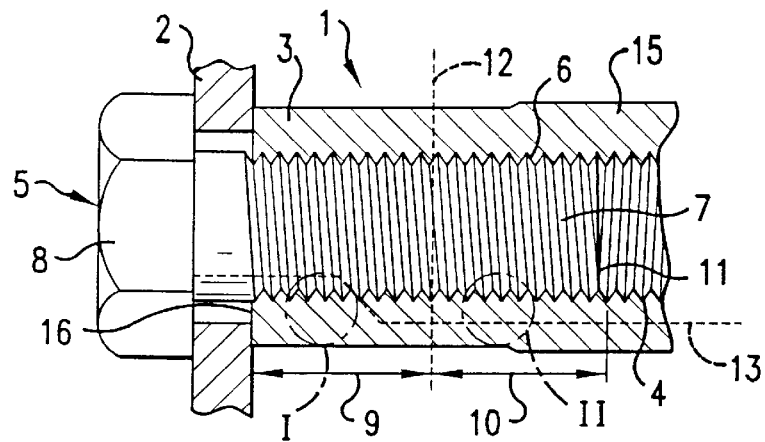
FIG. 1 is a lateral longitudinal sectional view of the bolted connection with a device according to a preferred embodiment of the present invention in an undamaged condition.

FIG. 1 illustrates a bolted connection 1 which can be used, for example, in vehicles, particularly utility vehicles, preferably semitractor trailers. In semitractor trailers, for assembling a light-weight module frame, the front axle support and the rear axle support, which are constructed as light-metal cast alloy parts 2, must be fastened to a side member intermediate module which is formed of several light-metal extruded hollow sections 3.

Figure 2:
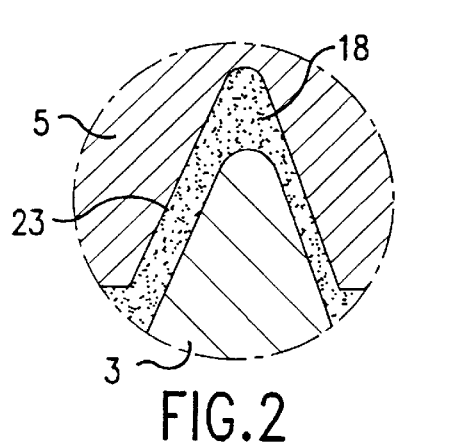
FIG. 2 is an enlarged longitudinal sectional cutout of the detail I of the portion of the bolted connection of FIG. 1, which has no play.

For this purpose, the hollow section 3 has an internal thread 4 into which the bolt 5 is screwed via the external thread 6 of its barrel 7. Along a partial length (forward area 9) of its barrel 7, the bolt 5 is additionally glued (FIG. 2) to the hollow section 3, starting from the beginning of the engagement of the threads 6, 4 in the proximity of the bolt head 8, thus from the forward connection end. In this case, the bonding agent 23 hardens and, as the result, divides the bolted connection 1 into a forward area 9 without play and into a rearward area 10 with play which directly adjoins the forward area 9. For a sufficient capacity of a bolted connection 1 made of aluminum to be stressed, it is necessary that the overlapping length of the hollow section 3 and the bolt 5 amounts to at least 2.5 times the bolt diameter so that the permissible surface pressure or the apparent yielding point of the bolt 5 is not exceeded. In the case of a bolted connection, 1 made of steel, the minimal overlapping length is in the range of 1.1 times the bolt diameter.

In the area 9 without play, the bolted connection 1 is very stiff and of very low elasticity, particularly in the axial direction of the bolted connection 1, such that it exceeds the low yield capacity of the bolted connection 1 at the connection end 11 pointing in the joining direction. Because of the low axial yield capacity of the connection, an excess of tension normally occurs at this connection end 11 in the case of an overstressing, which after some time leads to fatigue and thus to a complete fracture (i.e. tearing-off) of the bolted connection at connection end 11. Because of the formation of an area 9 without play, the tension excess during the overstressing of the bolted connection is displaced to the transition 12 of the area 9 without play to the area 10 with play so that the sudden transition 12 virtually creates a predetermined breaking point at which, however, only one of the two joining partners (the bolt 5 and the hollow section 3) depending on the dimensioning of the thickness of the bolt 5 and of the wall thickness of the hollow section 3 relative to one another, will break axially in a locally limited manner in the circumferential direction. However, the connection remains capable of bearing a load, in which case the length of the bolt 5 must be sufficient in the hollow section in the area of the connection which still meets the operability requirements.

A complete tearing-off of the bolted connection 1 does not occur because it has an area 10 with play which, after the crack formation, at the transition 12, can alone take over the bearing function of the bolted connection 1. This is illustrated by the dotted lines of the flux of force 13 and 14 of FIGS. 1 and 4. In FIG. 1, the flux of force of the bolted connection 1, during a normal stressing which is free of damage in the area 9 without play changes over from the bolt 5 to the hollow section 3 and continues therein. According to FIG. 4, after the crack-generating overstressing, the flux of force extends into the original area 10 with play in order to only then change over to the hollow section 3.

In order to create the transition 12 forming the predetermined breaking point, it is also contemplated to provide the bolt 5 with a bonding agent only on a narrow circumferential strip which will then form the transition 12 to two areas 10 with play, one respectively in front and one behind the transition 12.

Figure 4:
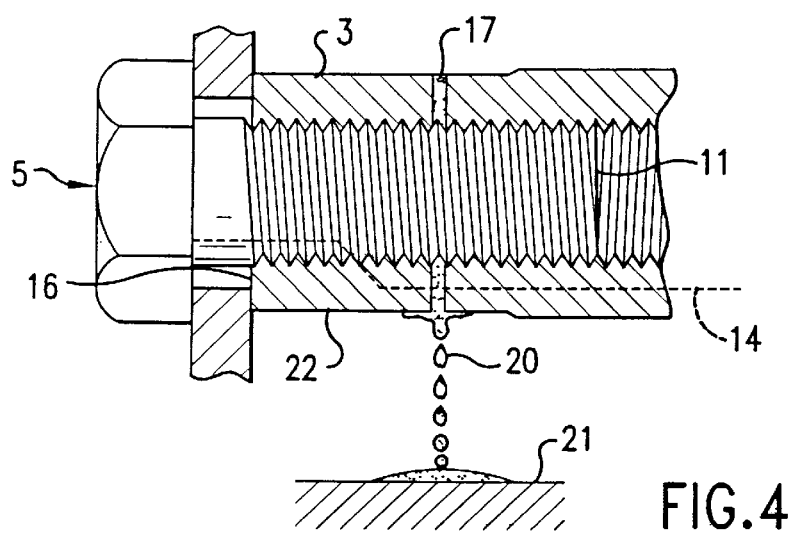
FIG. 4 is a lateral longitudinal sectional view of the bolted connection of FIG. 1 with a crack formation at a predetermined breaking point and dye emerging from the crack.

As illustrated in the two FIGS. 1 and 4, the hollow section 3 has a surrounding wall thickening 15 at the connection end 11. This wall thickening 15 has the purpose of causing an increase of the stability of the connection at this point so that the displacement of a crack 17 to the predetermined breaking point is promoted. Furthermore, by providing a surrounding notch on the circumference of the hollow section 3 at the point of the transition 12, the localization of the crack 17 can be further assured.

It is also contemplated that the bolted connection 1 at the connection end 11 pointing into the joining direction has no wall thickening 15. In order to counter the notch effect which has a negative effect on the stability of the bolted connection 1 and in order to thereby increase the useful life of the bolted connection 1, the thread-bearing bore of the hollow section 3 on the connection end 11 may be provided with a smooth-cylindrical axial expansion, a so-called "undercut", which is rounded out in a barrel-type manner with a large radius of the rounded end.

The construction of an area 9 without play can be carried out in many ways. As indicated above, the bolt 5 may be glued together with the hollow section 3. A microencapsulated two-constituent bonding agent is advantageous for this purpose which is distributed in the thread turns of the bolt 5. Because of the shearing forces occurring during the screwing-in, the capsules, which each contain one bonding agent constituent, will burst, the bonding agent constituents will mix with one another and, after the hardening, will form a particularly firm and stiff glued connection of the two joining partners.

As an alternative, a bolt with a thread which is self-grooving (self-tapping) along a partial section is also contemplated, in which case the inside diameter of the bore of the hollow section 3 on this section must be smaller than the outside diameter of the external thread 6. As another alternative, it is contemplated that a metallic intermediate layer, such as a metal foil strip or a stranded band, is placed on a partial section of the external thread 6 of the bolt 5, with which the bolt 5 is screwed into the hollow section 3, the area 9 without play being formed by this partial section. Instead, non-metallic intermediate layers, such as hemp or a plastic foil strip, can also be used in this case.

The crack 17 therefore takes place along the transition 12 in the circumferential direction of the bolted connection 1, which is designed such that the wall thickness of the hollow section 3 is relatively small in comparison to the bolt thickness, after which the hollow section 3 breaks at the transition 12. In order to make the crack 17 clearly noticeable, a signaling device is provided on the bolted connection 1 which triggers detectable signals which cannot be missed even during superficial viewing.

Figure 3:
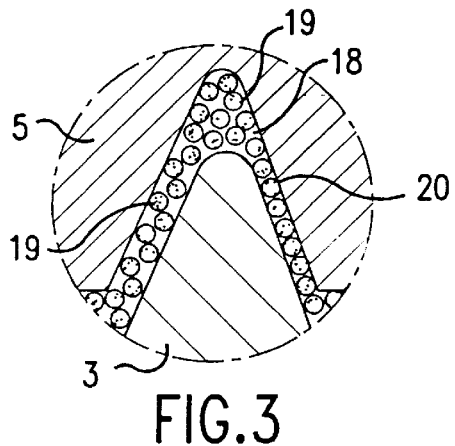
FIG. 3 is an enlarged longitudinal sectional cutout of the detail II of the portion of the bolted connection of FIG. 1, which has play.

As illustrated in FIG. 3, the device is embedded in the area 10 of the bolted connection 1, which has play, in the thread runs 18 of the bolt 5 or the internal thread 4 of the hollow section 3 and is constructed in the form of microcapsules 19, which contain a fluidic dye 20, preferably a liquid. In the event of a crack formation of the hollow section 3, a change of the flux of force takes place from the area 9 without play to the area 10 with play of the bolted connection 1, whereupon the microcapsules 19 are crushed because of the alternating stress of the area 10 of the bolted connection 1 having play which now carries the flux of force. The fluidic dye 20, which now escapes from the microcapsules 19, emerges by way of the play gap between the bolt 5 and the hollow section 3 at the predetermined breaking point of the hollow section 3 from the hollow section 3, and according to FIG. 4, drips onto component surfaces 21 situated in the vicinity of the bolted connection 1. It is also contemplated that the emerging dye 20 adheres on the exterior side of the hollow section 3 essentially to the point of the crack in a concentrated manner, forming a visually noticeable signal due to its color which differs from that of the connection partners of the bolted connection 1. The contrast between the color of the dye 20 and that of the connection partners, 3, 5 or that of the component surfaces 21 should advantageously be considerable so that it is ensured that it attracts attention. Furthermore, the color should be intense. It may also be fluorescent or such that a crack 17 can be detected also at night, that is, in darkness. Instead of the dye 20, a scent-intensive fragrance may also be used which, due to its pungency, easily signals damage to the bolted connection 1. When microcapsules 19 are used, it is advantageous that, with respect to their arrangement expenditures, after being embedded in the thread runs 18 of the bolt 5, when the bolt 5 is screwed into the hollow section 3, they can be positioned on the connection path so that they are ready to be destroyed. Furthermore, no additional space-requiring signal display device is required because the visually noticeable signal of the color of the fluidic dye 20 situated in the microcapsules 19 is delivered by the adhering to the exterior side 22 of the hollow section 3 itself, provided there is a color contrast with the surroundings.

Figure 5:
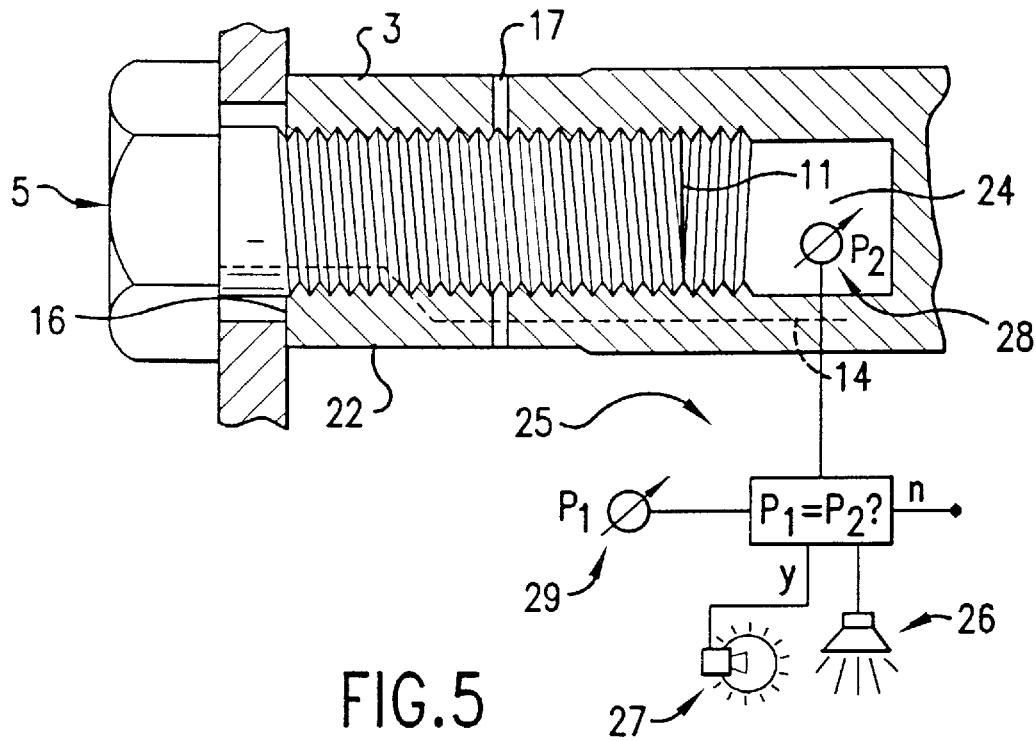
FIG. 5 is a lateral longitudinal sectional view of a bolted connection according to another preferred embodiment of the present invention with a crack formation at a predetermined breaking point and a pressure gauge.

As an alternative to the microcapsules 19 filled with the dye 20 and embedded in the area 10 of the bolted connection 1 which has play, the device according to FIG. 5 may also be a hollow space 24 filled with pressurized gas. At least up to the transition 12 at which the hollow section 3 breaks, this hollow space 24 is arranged in the area 10 which has play. The hollow space 24 may be formed by the play gap of the area 10. It is also contemplated that the hollow section 3 itself is hollowed out and the ring-shaped cavity forming the hollow space 24 extends along the area 10 having play as well as along the area 9 without play. In the event of a crack 17, the pressurized gas emerges from the hollow section 3, creating a pressure drop in the hollow space 24. For a detection of this pressure drop, the hollow space 24 is connected with a pressure cell 25 which, in the event of a pressure drop, emits an electric voltage signal which, by way of an electric circuit, is reproduced as a sound signal, for example, by the triggering of a buzzer 26 in the driver's cab, or is reproduced as a light signal by the flashing of a control light 27 in the dashboard of the vehicle. The visually or acoustically noticeable signal may be a constant signal or several signal pulses with a noticeable spacing between the pulses. The pressure cell 25 measures the pressure $p_2$ within the hollow space 24 and compares it in an electronic comparing unit with an ambient pressure $p_1$. The pressure cell 25 detects the pressures $P_1$ and $P_2$ via pressure sensors 28 and 29, as, for example, piezo elements. If the pressures are the same, this is an indication of a pressure drop, whereupon the respective voltage signal is emitted to the buzzer 26 and/or the control light. Instead of the pressurized gas, a vacuum may exist in the hollow space 24, whose change to the atmospheric pressure level in the event of a crack 17 can also be detected by a pressure cell 25.

Figure 6:
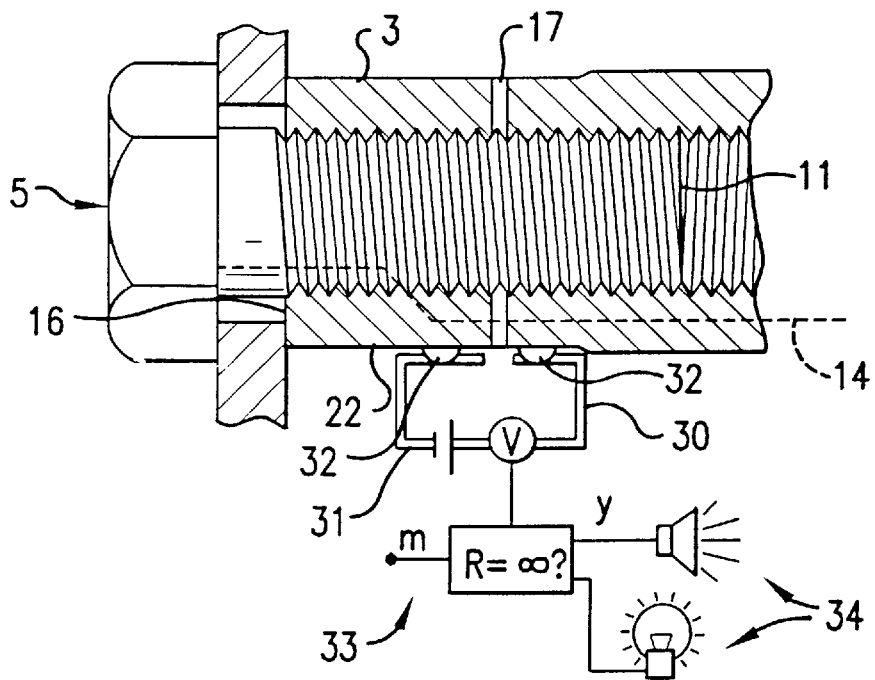
FIG. 6 is a lateral longitudinal sectional view of a bolted connection according to another preferred embodiment of the present invention with a crack formation at a predetermined breaking point and a ripping wire integrated in an electric resistance measuring device.

Another alternative to the device in the form of microcapsules 19 and in the form of the above-described pressure gauging, according to FIG. 6, consists of a ripping wire 30 which is integrated in an electric circuit 31 of the arrangement. The ripping wire 30 is mounted on, preferably glued with a bonding agent 32, to the exterior side 22 of the hollow section 3, spanning the point of the expected crack 17 along the course of the bolted connection 1. As a result of the forming crack 17 of the hollow section 3, the ripping wire will then also be torn apart. The interruption of the electric circuit 31 is detected by a resistance measuring device 33 which is integrated in the latter and which detects in this case that the resistance of the electric circuit 31 has become infinite. The measuring device 33 then emits a switching signal which triggers an acoustic or visual signal in a connected consuming device 34, a buzzer or a control light. This signal may be designed as in the above-mentioned pressure drop gauging.

According to the two last-mentioned basic embodiments, an on-board detection of a fatigue fracture and thus the condition of the bolted connection 1 can advantageously be carried out inside the vehicle by using only a small number of components containing the device; that is, the driver already detects the crack formation of the bolted connection 1 while this event occurs. In the case of all three embodiments, it is not required to await the inspection which takes place only after a defined time interval, in order to obtain information on the condition of the bolted connection. On the contrary, when damage is detected, the consulting of a repair shop prevents that, by waiting for the operating test at the time of the next predetermined servicing, a final breaking of the bolted connection occurs during the driving operation which may result in a more or less serious accident involving the vehicle.

Summarizing, a bolted connection according to the invention is divided into areas of different axial yielding capacities of the interior joining partner 5, 19 in the connection which is inserted into the exterior joining partner constructed as a hollow section 3. The change of the yielding capacity takes place in a sudden manner at the point of the transition 12 of the areas into one another. In the event of an overstressing, tension excesses will now occur at this transition 12 instead of at the end 11 of the connection pointing into the joining direction. As the result of these tension excesses and caused by fatigue, after a certain number of stress plays, a crack 17 will occur there on one of the two joining partners, depending on the layout of the ratio of the wall thickness of the section 3 to the thickness of the bolt 5. A fatigue pressure on the end of the connection pointing in the joining direction is therefore delayed. The area of the bolted connection between a crack 17 on the section 3 and the end of the bolted connection 11, after this crack formation, still has a sufficient bearing capacity for additional alternating stresses in the joining direction. Only at a later point in time will a crack formation occur for the above-mentioned reasons at the connection end 11 in the joining direction, which crack formation finally completely destroys the connection capable of bearing. The transition 12 between the areas 9, 10 represents a predetermined breaking point which is locally set up in a targeted manner and at which the occurrence of a first crack 17 which precedes the crack opening up the bolted connection and which is axially spaced with respect thereto, operates as an indicator for the stressability condition of the bolted connection and thus as information concerning a later complete failure of the bolted connection. In order to securely detect the crack 17, the above-mentioned devices are provided which, by means of their forced destruction occurring in parallel with the crack formation or following it, trigger signals which can clearly be detected visually or acoustically.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for detecting a fatigue fracture due to alternate axial stress in a bolted connection, comprising:

a hollow section having an internal thread;

a bolt with an external thread being threaded into said internal thread of said hollow section over an axial distance, said axial distance including a rearward area extending from a connection end of the bolt with play between said internal thread and said external thread, and a forward area adjacent to said rearward area without play between said internal thread and said external thread, said rearward area and said forward area defining a predetermined breaking point therebetween at which said hollow section will crack in a transverse direction due to fatigue from said alternate axial stress, said predetermined breaking point being located such that the bolt continues to support the hollow section at the rearward area after said hollow section cracks; and a signaling device arranged adjacent said predetermined breaking point, said signaling device triggering at least one signal which can be noticed visually or acoustically when said hollow section cracks.

2. An arrangement according to claim 1, wherein said signaling device comprises microcapsules embedded between the internal thread and the external thread along at least a portion of said rearward area, said microcapsules containing a fluidic dye, said microcapsules being crushed when said hollow section cracks such that said dye emerges from the microcapsules and flows through said crack to an exterior side of the hollow section to visually signal said crack.

3. An arrangement according to claim 1, wherein said signaling device comprises a hollow space filled with a pressurized gas and connected with said rearward area, and a pressure cell which is in contact with the hollow space and which emits at least one voltage signal which generates a sound or light signal due to a pressure drop in said hollow space when said hollow section cracks.

4. An arrangement according to claim 1, wherein said signaling device is a ripping wire which is integrated in an electric circuit and which is mounted on an exterior side of the hollow section to span said predetermined breaking point, the ripping wire ripping when said hollow section cracks and triggering an acoustic or visual signal in a consuming device connected with the electric circuit.

5. An arrangement according to claim 4, wherein said consuming device is connected with the electric circuit via a resistance measuring device.

6. A method for detecting a fatigue fracture due to alternate axial stress in a bolted connection comprising a hollow section having an internal thread, a bolt with an external thread being threaded into said internal thread of said hollow section over an axial distance, said axial distance including a rearward area extending from a connection end of the bolt with play between said internal thread and said external thread, and a forward area adjacent to said rearward area without play between said internal thread and said external thread, said rearward area and said forward area defining a predetermined breaking point therebetween at which said hollow section will crack in a transverse direction due to fatigue from said alternate axial stress, said predetermined breaking point being located such that the bolt continues to support the hollow section at the rearward area after said hollow section cracks, said method comprising:

arranging a signaling device adjacent said predetermined breaking point, said signaling device triggering at least one signal which can be noticed visually or acoustically when said hollow section cracks.

7. A method according to claim 6, wherein said signaling device comprises microcapsules embedded between the internal thread and the external thread along at least a portion of said rearward area, said microcapsules containing a fluidic dye, said microcapsules being crushed when said hollow section cracks such that said dye emerges from the microcapsules and flows through said crack to an exterior side of the hollow section to visually signal said crack.

8. A method according to claim 6, wherein said signaling device comprises a hollow space filled with a pressurized gas and connected with said rearward area, and a pressure cell which is in contact with the hollow space and which emits at least one voltage signal which generates a sound or light signal due to a pressure drop in said hollow space when said hollow section cracks.

9. A method according to claim 6, wherein said signaling device is a ripping wire which is integrated in an electric circuit and which is mounted on an exterior side of the hollow section to span said predetermined breaking point, the ripping wire ripping when said hollow section cracks and triggering an acoustic or visual signal in a consuming device connected with the electric circuit.

10. An arrangement according to claim 9, wherein said consuming device is connected with the electric circuit via a resistance measuring device.

\* \* \* \* \*